(12) United States Patent
Biehl et al.

(10) Patent No.: US 9,702,509 B2
(45) Date of Patent: Jul. 11, 2017

(54) METHOD FOR PRODUCING AN ESCAPE ROUTE MARKING FOR AIRPLANES, AND SAID ESCAPE ROUTE MARKING

(71) Applicant: Lufthansa Technik AG, Hamburg (DE)

(72) Inventors: Torben Biehl, Hamburg (DE); Hans-Christian Lierow, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 343 days.

(21) Appl. No.: 14/421,559

(22) PCT Filed: Aug. 14, 2013

(86) PCT No.: PCT/EP2013/002444
§ 371 (c)(1),
(2) Date: Feb. 13, 2015

(87) PCT Pub. No.: WO2014/026764
PCT Pub. Date: Feb. 20, 2014

(65) Prior Publication Data
US 2015/0252951 A1    Sep. 10, 2015

(30) Foreign Application Priority Data

Aug. 14, 2012 (DE) ........................ 10 2012 016 046

(51) Int. Cl.
*F21K 2/00* (2006.01)
*C09D 5/22* (2006.01)
(Continued)

(52) U.S. Cl.
CPC .............. *F21K 2/00* (2013.01); *B29C 51/002* (2013.01); *B29C 51/12* (2013.01); *B29C 51/30* (2013.01);
(Continued)

(58) Field of Classification Search
CPC .... F21K 2/00; B60Q 3/78; B60Q 3/46; B29C 51/30; B29C 51/12; B29C 51/002;
(Continued)

(56) References Cited

U.S. PATENT DOCUMENTS 4,208,300 A    6/1980 Gravisse
4,401,050 A    8/1983 Britt et al.
(Continued)

FOREIGN PATENT DOCUMENTS

CN    101 668 563 A    3/2010
CN    102 597 601 A    7/2012
(Continued)

OTHER PUBLICATIONS

Translation of the International Preliminary Report on Patentability and Written Opinion of the International Searching Authority in application PCT/EP2013/002444, dated Feb. 26, 2015.

*Primary Examiner* — David Porta
*Assistant Examiner* — Gisselle Gutierrez
(74) *Attorney, Agent, or Firm* — Young Basile Hanlon & MacFarlane, P.C.

(57) ABSTRACT

A method for producing an escape route marking in a heatable and malleable support mold is described. The escape route marking has a transparent covering, a supporting element and a photoluminescent material. The method includes procuring the heatable and malleable support mold, inserting a supporting element into the support mold, arranging the photoluminescent material on the supporting element, arranging the transparent covering on the supporting element, heating and deforming the escape route marking in the support mold and solidifying the escape route marking in the support mold in a predetermined position. The resulting escape route marking is also described.

19 Claims, 6 Drawing Sheets

(51) Int. Cl.
  *B29C 51/00* (2006.01)
  *B29C 51/12* (2006.01)
  *B29C 51/30* (2006.01)
  *B60Q 3/46* (2017.01)
  *B60Q 3/78* (2017.01)
  *B29K 69/00* (2006.01)
  *B29L 9/00* (2006.01)
  *B29L 31/00* (2006.01)
  *F21W 101/06* (2006.01)
  *F21W 111/00* (2006.01)

(52) U.S. Cl.
  CPC ............... *B60Q 3/46* (2017.02); *B60Q 3/78* (2017.02); *C09D 5/22* (2013.01); *B29K 2069/00* (2013.01); *B29K 2883/005* (2013.01); *B29K 2995/0035* (2013.01); *B29L 2009/00* (2013.01); *B29L 2031/772* (2013.01); *F21W 2101/06* (2013.01); *F21W 2111/00* (2013.01)

(58) Field of Classification Search
  CPC .. C09D 5/22; F21W 2101/06; F21W 2111/00; B29L 2031/772; B29L 2009/00; B29K 2995/0035; B29K 2883/005; B29K 2069/00
  USPC .......................................... 250/483.1; 264/21
  See application file for complete search history.

(56) References Cited

U.S. PATENT DOCUMENTS

| | | |
|---|---|---|
| 5,387,458 A | 2/1995 | Pavelka et al. |
| 8,393,744 B2 | 3/2013 | Lierow |
| 2010/0149825 A1 | 6/2010 | Sutter |
| 2010/0165648 A1* | 7/2010 | Lierow .................... A62B 3/00 362/470 |
| 2011/0049756 A1* | 3/2011 | Sutter .................... C09K 11/02 264/241 |
| 2012/0282428 A1 | 11/2012 | Sutter |

FOREIGN PATENT DOCUMENTS

| | | | |
|---|---|---|---|
| DE | 26 15 926 A1 | 10/1976 | |
| DE | CA 2717003 A1 * | 9/2009 | ............ C09K 11/02 |
| DE | 10 2009 040 040 A1 | 3/2011 | |
| DE | CA 2772683 A1 * | 3/2011 | ............ C09K 11/02 |
| EP | 0 489 561 A1 | 6/1992 | |
| EP | 0 828 657 B2 | 7/2009 | |
| FR | 2 308 155 | 11/1976 | |
| GB | 2 448 424 A | 10/2008 | |
| KR | 20140007047 A * | 1/2014 | |
| WO | 87/02813 A1 | 5/1987 | |
| WO | 94/17766 A1 | 8/1994 | |
| WO | 96/33093 A1 | 10/1996 | |
| WO | 2008/110343 A1 | 9/2008 | |
| WO | 2008/110344 A1 | 9/2008 | |
| WO | 2009/106342 A1 | 9/2009 | |
| WO | 2011/026598 A1 | 3/2011 | |

* cited by examiner

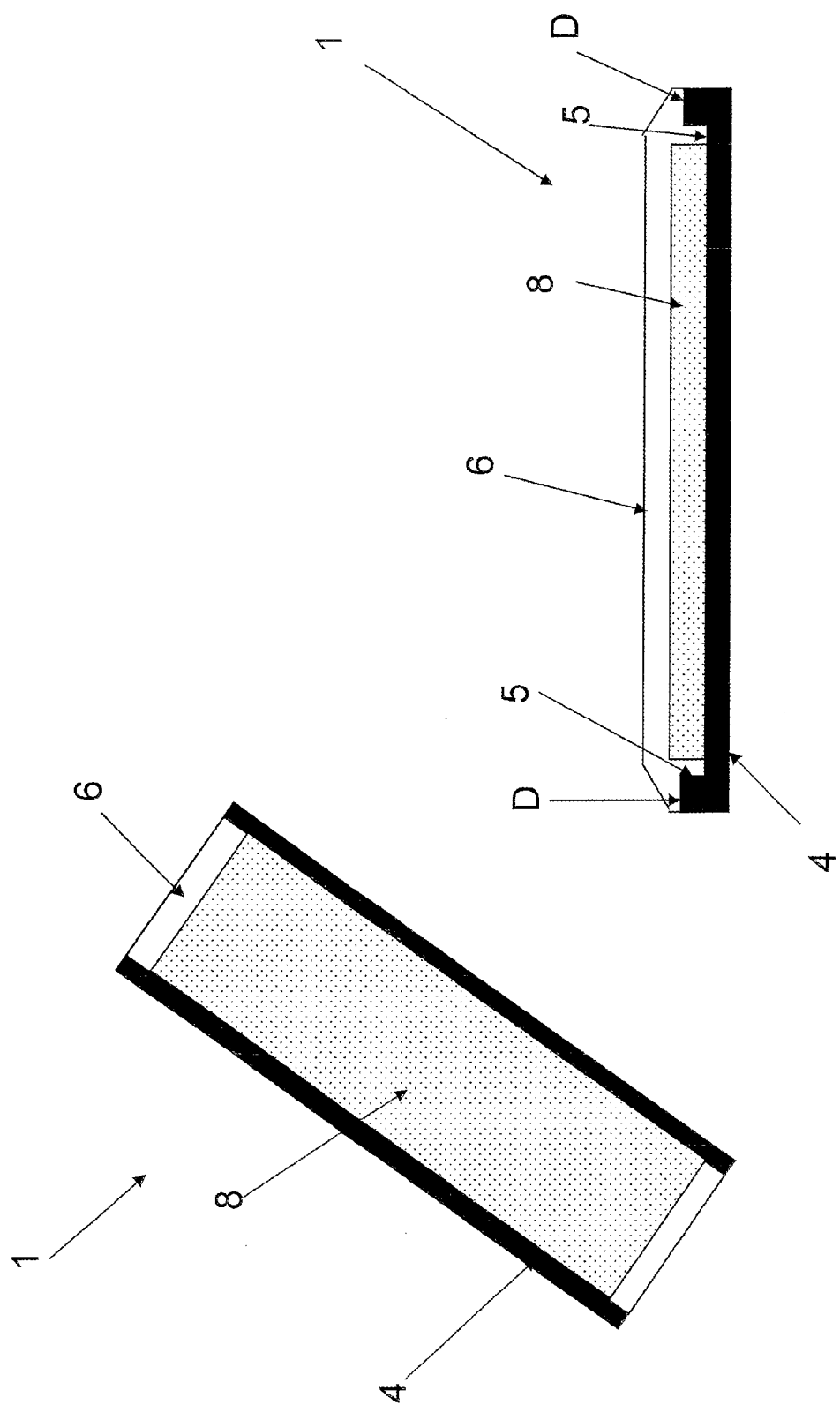

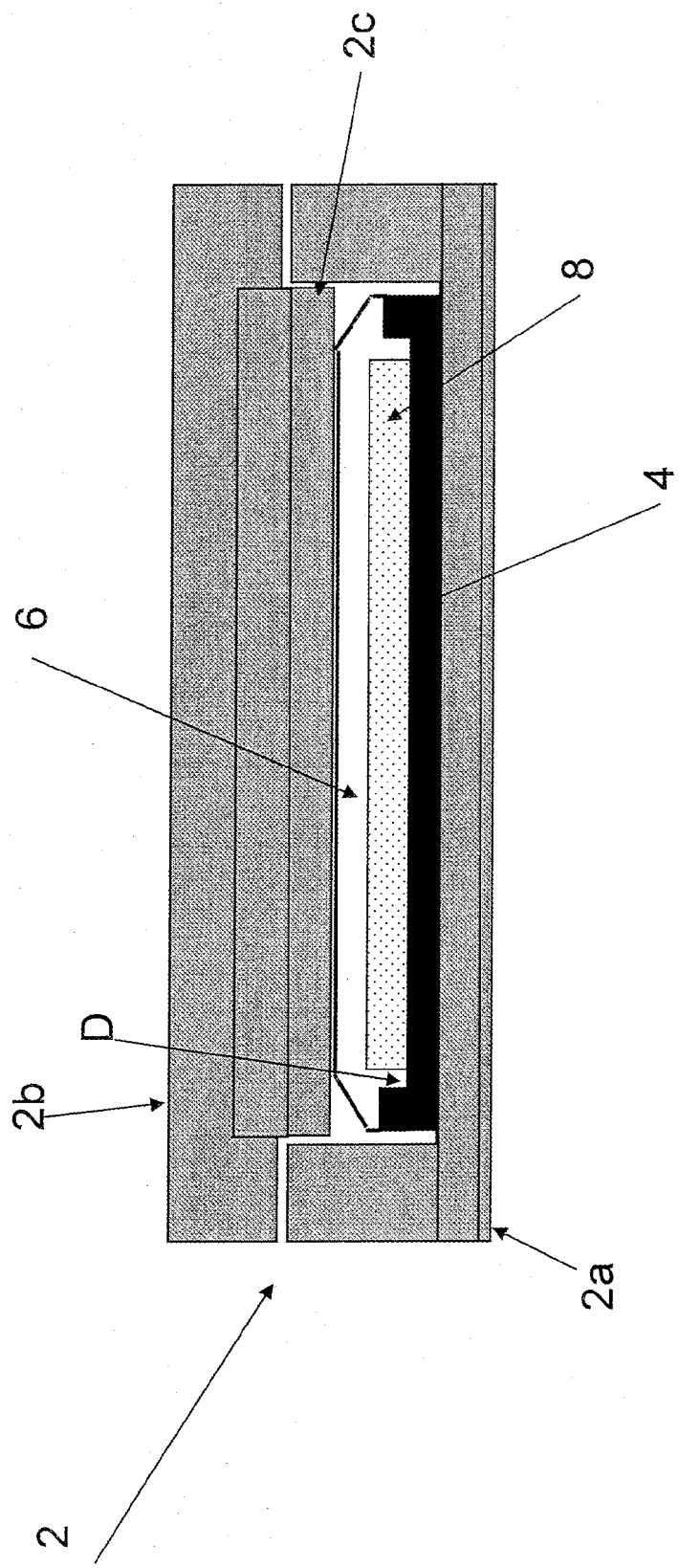

METHOD FOR PRODUCING AN ESCAPE ROUTE MARKING FOR AIRPLANES, AND SAID ESCAPE ROUTE MARKING

FIELD OF THE DISCLOSURE

The present invention relates to a method for producing an escape route marking for airplanes and an escape route marking produced according to the method.

BACKGROUND

Escape route markings are of particular importance in emergency situations in which a power supply cannot always be guaranteed. It is known to arrange photoluminescent strips on the floor inside the airplane for escape route marking in airplanes, which is also called emergency marking. Photoluminescence is occasionally termed afterglow and/or phosphorescence. The safety-related requirements are specified for example in German Industrial Standard DIN 67 510. The strips are placed on the floor in a straight line and, in an emergency, indicate to passengers and the flight crew the path to ways out and emergency exits. In the past when designing airplanes, photoluminescent strips became increasingly prevalent because they are failsafe and can work without a power supply.

An emergency lighting, in which a photoluminescent strip is arranged in a transparent supporting element, is known for example from WO 96/33093 A1. The supporting element can thereby be designed as one, two or three pieces. Each supporting element has an elongated, rectangular shape and can be correspondingly laid in a 90° and 180° orientation with respect to another supporting element.

A photoluminescent reflector layer is known from WO 94/17766 A1. It is suggested to produce elongated strips from the planar material.

A photoluminescent escape route marking made of elongated strips is known from U.S. Pat. No. 4,401,050. Arrows are provided as directional indicators for the marked escape route.

Directional indicators for the escape route are known from WO 87/02813 A1, which work with photoluminescent means and are arranged on the floor along the aisle of the airplane as individual unconnected arrows.

A continuous fluorescent layer is known from EP 0 489 561 A1, in which color pigments are incorporated in a polymer matrix. The fluorescent material can be incorporated in a carrier medium that lends the fluorescent light various optical properties by means of additional filters.

Safety signs provided with photoluminescent material are known from FR 2 308 155 A1.

U.S. Pat. No. 4,208,300 describes a composition for photoluminescent material that can be used on stairs and in street traffic.

An escape route marking for airplanes, which has an afterglowing, photoluminescent material that is laid on the floor in several elements, is known from WO 2008/110343 A1. At least one element has a bent shape.

EP 08 28 657 B2 describes an escape route marking that has two thin layers of photoluminescent material to increase the light emission. The light transmission through the photoluminescent material is changed by a printed or colored, partially transparent covering, or by a color filter below the covering.

SUMMARY OF THE DISCLOSURE

The requirements for the design of the furnishing of the air passenger cabin are changing. In particular, there is a trend to no longer provide rectangular furniture, but rather also to use curved furniture contours. Besides the aesthetic effect of curved furnishings, for example seats with a curved outer contour, cabinets and counters in the service area, curved furnishings also have safety-related advantages because the passengers are less likely to injure themselves, for example. The furnishings designed in an increasingly complex manner, including their upholstery design in the cabin, make it necessary to also be able to flexibly customize the shape of the escape route markings.

According to the teachings herein, a method for producing an escape route marking and an escape route marking produced using the method are provided. The escape route markings are customizable in terms of shape with simple means for different requirements when designing the cabins of an airplane.

One method according to the invention for producing an escape route marking provides for the use of a heatable and malleable support mold. The method for production comprises the following steps. The heatable and malleable support mold is provided so that a supporting element can be inserted into the support mold. A photoluminescent material and a transparent covering are arranged on the supporting element in the support mold. After arrangements of the escape route marking with their different layers in the support mold, the support mold is heated together with escape route marking and deformed preferably after the heating. In the deformed position, the escape route marking solidifies in the support mold. Through use of a support mold, which is resistant to thermal changes on one hand and easily malleable on the other hand, the production of the escape route marking can be simplified considerably. Through use of the support mold, the parts of the escape route marking arranged on top of each other can only be displaced towards each other to an insignificant extent, whereby production can take place faster and with a more accurate fit. An escape route marking produced with the method according to the invention can be laid on the floor of an airplane and/or along the contours of the furnishings in the airplane. The photoluminescent material of the escape route marking shows the passengers and crew the shortest route to an emergency exit in an emergency. Furthermore, the escape route markings can be better integrated with the aesthetics of the interior design of the airplane without compromising safety-related requirements.

In an expedient design of the method, the photoluminescent material and the transparent covering on the supporting element are arranged on top of each other in the support mold. They are inserted into the support mold already arranged on top of each other.

Support molds made of silicone are particularly preferably used. In this case, after solidifying in the support mold, the support mold returns to its non-deformed initial position and the escape route marking remains in its deformed position. Silicone molds are particularly resistant and also flexibly malleable and sufficiently robust at the same time. Furthermore, a sticking together of the layers arranged on top of each other on the silicone mold due to the properties of the silicone is excluded. Due to the fact that the support mold returns to its non-deformed initial position after solidifying, the support mold can be reused for the production of further escape route markings, whereby such a support mold is economical.

According to a particularly preferred design of the method, the escape route marking in the support mold is first heated in the support mold and arranged in a solidification device for deforming and/or solidifying. The solidification device is provided to support the support mold and make it possible for the parts arranged on top of each other in the support mold to cool in an evenly immobilized manner.

In an advantageous design of the method, the solidification device is provided as a prefabricated solidification mold. The prefabricated solidification mold is more stable compared to the support mold and mainly non-malleable. A lower elasticity of the solidification mold is advantageous for the arrangement of the heated support mold in the solidification mold.

Another advantageous design provides that the solidification device is designed as a deforming device with a control unit. A deforming device designed with a control unit is preferably programmable, whereby any deformations can be set via the control unit.

For better handling of the deformation, it is preferably provided that the deforming device has a plurality of rods arranged in a parallel manner, which are shiftable in their longitudinal direction by the control unit, in order to bring the escape route marking into a predetermined position. The use of a plurality of rods arranged in a parallel manner makes it possible to bring about individual deformations of the support molds and the escape route markings arranged therein. The insertion of the support mold into the deforming device is also simplified considerably, in that the rods are moved back in their longitudinal direction first via the control unit so that the support mold is easy to use.

In an expedient design of the method, the rods are first moved into the determined position forming the deformation after the insertion of the heated support mold, so that the heated support mold including the escape route marking arranged in it can cool and the latter can solidify. After the solidification, the rods of the deforming device can be transferred from their deformation position into a position that makes it possible to easily remove the support mold and the escape route marking solidified in the support mold from the deforming device.

Another design of the method provides that the transparent covering comprises a thermally malleable plastic, preferably polycarbonate. Polycarbonates are plastics that have both a glass transition temperature as well as a melting temperature. Below the glass transition temperature, also called the softening temperature, the amorphous phase of the polycarbonate is in a solidified state, while above the glass transition temperature the polycarbonate is in a rubbery-elastic state. In the rubbery-elastic state, the polycarbonate is softened and can be correspondingly deformed. At temperatures above the melting temperature, the polycarbonate is in a liquid phase in which it can be mixed preferably with color pigments or other substances. Polycarbonates as well as other plastics can thus on one hand be mixed particularly well with other substances in one temperature range and thermally deformed in another temperature range.

According to another design of the method, the supporting element and/or the photoluminescent material and/or the transparent covering are thermally malleable respectively alone or together lying on top of each other. Thermally malleable materials are individually malleable, whereby they can be customized easier and better for the contour of the furnishings in the airplane cabin. If the supporting element and/or the photoluminescent material and/or the transparent covering are thermally deformed together on top of each other, potential displacements of the layers amongst each other or with respect to each other are avoided.

The escape route marking produced with the method according to the invention has a transparent covering and a photoluminescent material. Such an escape route marking can be laid on the floor and/or along the contours of the furnishings in the airplane. The photoluminescent material of the escape route marking shows the passengers and crew the shortest route to an emergency exit in an emergency. According to an implementation of the invention, the transparent covering has color pigments that lead to a transparent coloring of the escape route marking. The transparent covering can be customized for the furnishings in the airplane through the color pigments, whereby the escape route markings can be better integrated with the aesthetics of the interior design of the airplane without compromising safety-related requirements. Furthermore, differently colored color pigments can be used for different interior designs of different airplanes so that the transparent coverings of the escape route markings can be correspondingly customized. In the case of escape route markings known from the state of the art, which were customized in terms of color, they could not be easily deformed since for example film strips were arranged on the fluorescent strips. The film would be crumpled or even ripped during the deforming of such film strips.

In a preferred design, the escape route marking has at least one non-linear track section with one or more radii. Escape route markings with non-linear track sections can run in arches and curves. The escape route marking can thereby be individually customized for the designs of the airplane cabin and thus follow specified contours, in particular the contours of the furnishings. With non-linear track sections, strip-like sections of the escape route marking are marked, which extend in an arch rather than in a straight line in the plane in which they are laid.

According to one design, the escape route marking has at least one curved section with opposite curvatures. The escape route marking produced with the method according to the invention is producible with opposite curvatures in particular with left-curved and right-curved sections, whereby escape route markings bent in any manner with smooth transitions occur. Due to the opposite curvatures, curved sections have an inflection point along their contour, at which a right or left curvature transitions into a left or respectively right curvature.

According to a preferred design, the transparent covering has a thermally malleable plastic, preferably a polycarbonate. Polycarbonates are plastics that have both a glass transition temperature as well as a melting temperature. Below the glass transition temperature, also called the softening temperature, the amorphous phase of the polycarbonate is in a solidified state, while above the glass transition temperature the polycarbonate is in a rubbery-elastic state. In the rubbery-elastic state, the polycarbonate is softened and can be correspondingly deformed. At temperatures above the melting temperature, the polycarbonate is in a liquid phase, in which it can be mixed preferably with color pigments. Polycarbonates can thus on one hand be dyed particularly well in one temperature range and thermally deformed in another temperature range.

In a preferred design, the photoluminescent material is provided in the form of strips with a length and a width matching the dimensions of the transparent covering. The photoluminescent strips can have for example photoluminescent pigments that are integrated in a polymer matrix, preferably in a silicon or polycarbonate matrix.

According to a preferred embodiment, the photoluminescent material is arranged on or in a supporting element in the form of a strip matching the dimensions of the supporting element and on it the transparent covering is arranged. The transparent covering thus offers protection for the photoluminescent material from damage and humidity.

In an advantageous design of the escape route marking, a base area of the supporting element is designed in a rectangular manner, wherein side walls with a thickness D extend along each delimitation of the base area at an angle to the base area, whereby a recess is formed in the supporting element. The side walls preferably stand perpendicular to the base area. A photoluminescent material can be positioned in such a recess to avoid slipping.

In an advantageous embodiment of the escape route marking, the transparent covering has a rectangular base area, which has projections extending at an angle in the form of side walls with a thickness D' at a distance from the delimitation of the base area, wherein the projections are designed such that their outsides rest on the insides of the side walls of the supporting element and a hollow space is formed between the transparent covering and the supporting element for receiving the photoluminescent material when the transparent covering is placed on the supporting element.

According to a preferred design of the escape route marking, the transparent covering and the supporting element are designed as a one-piece hollow profile. A photoluminescent fluorescent strip can then be incorporated into the hollow profile, preferably through injection or infusion of a silicone or polycarbonate mass in which the photoluminescent pigments are incorporated.

BRIEF DESCRIPTION OF THE DRAWINGS

Preferred exemplary embodiments are explained in greater detail below based on the figures. In the figures:

FIG. 1 shows a view of a straight, colored fluorescent strip with dyed covering;

FIG. 2 shows a cross-sectional view of a straight, colored fluorescent strip with dyed covering;

FIG. 3A shows a cross-sectional representation of a straight, colored fluorescent strip according to FIG. 2 in a first support mold;

DETAILED DESCRIPTION

Figure 3B:
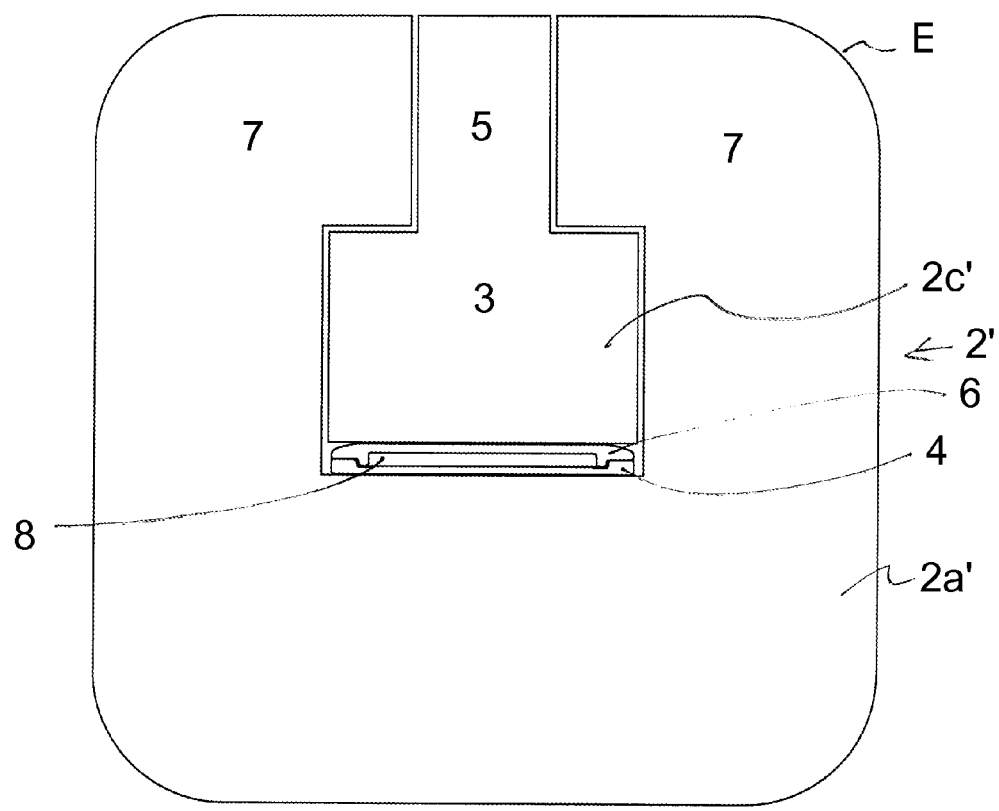
FIG. 3B shows a cross-sectional representation of a second support mold.

FIG. 1 shows an escape route marking 1 in a straight mold with a dyed, transparent covering 6. An afterglowing, photoluminescent material 8, which is in turn arranged lying in a planar manner on a supporting element 4, is arranged below the dyed, transparent covering 6. The photoluminescent material 8 is provided in a transparent supporting element according to FIG. 1. The supporting element can be designed transparently, but can also be designed non-transparently when it is connected with the substrate in the laid state of the escape route marking. Alternatively, the photoluminescent material 8 is also poured into the transparent supporting element. The photoluminescent material 8 can then be made for example of photoluminescent pigments, which are incorporated in a polymer matrix, preferably a silicone or polycarbonate matrix.

FIG. 2 shows a cross-sectional representation of the escape route marking according to FIG. 1. It can be seen in the cross-section that the supporting element 4 has a recess 5, into which the photoluminescent material 8 is inserted. According to FIG. 2, the dimensions of the photoluminescent material 8 are designed slightly smaller than the recess 5 of the supporting element 4 so that a joint extending in the longitudinal direction results laterally. A covering 6 is applied to the photoluminescent material 8 and ends laterally with the edge of the supporting element 4. The joints between the edges of the photoluminescent material 8 and the edges of the recess 5 are filled with the side walls or projections of the covering 6. Alternatively, the photoluminescent material 8 can be custom-fit for the recess 5 of the supporting element 4. In this alternative, the rectangular covering 6 does not have projections, but is for example glued or welded with the supporting element 4. The gluing or welding of covering 6 and supporting element 4 can be performed before or after a fluorescent strip is arranged in the supporting element 4. If the fluorescent strip is inserted into the hollow profile formed by the covering 6 and supporting element 4 only after the gluing or welding, this can preferably occur through insertion of a silicone or polycarbonate mass containing the photoluminescent pigments.

FIG. 3A shows the straight escape route marking from FIG. 2, inserted into a support mold 2. The support mold 2 has a pot-like body 2a, in which the straight escape route marking is inserted. Furthermore, the support mold 2 has a cover 2b with a punch-like protruding part or projection 2c. The punch-like projection 2c makes it possible to form the surface of the escape route marking in a planar manner through the effect of the weight of the cover 2b. Once the parts 4, 6 and 8 are inserted in the support mold 2, the support mold 2 including the introduced layers is heated to a temperature. The support mold 2 is preferably heated to a temperature above the glass transition temperature but below the melting temperature of the used materials. For the tempering of the support mold 2, a thermoelement can be arranged in the support mold 2, on or in the photoluminescent mass.

Figure 4:
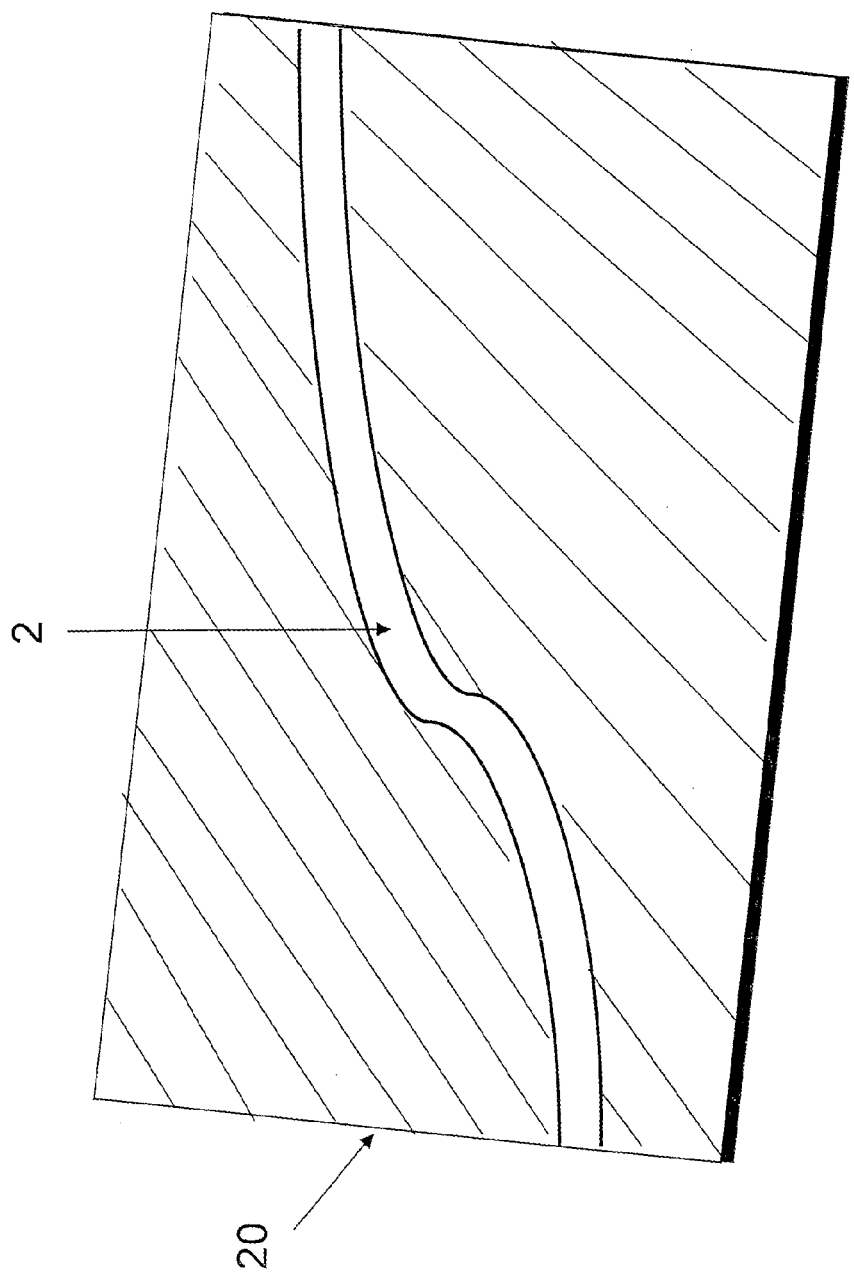
FIG. 4 shows a prefabricated mold into which a support mold is inserted.
Figure 5:
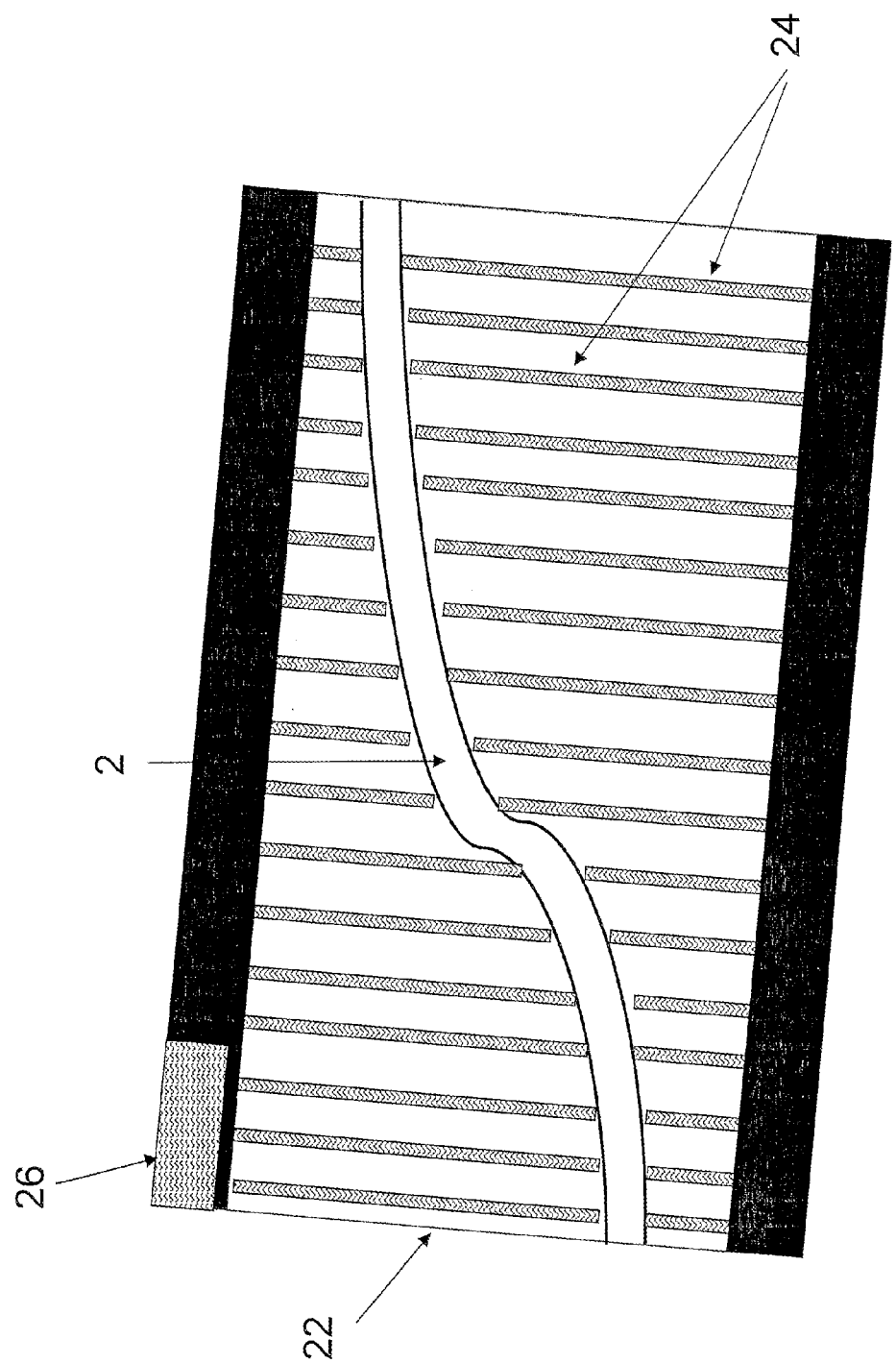
FIG. 5 shows a deforming device with a plurality of rods, wherein a support mold is inserted in the deforming mold.

After heating, the support mold 2 is inserted either into a prefabricated solidification mold according to FIG. 4 or into a deforming device 22 according to FIG. 5.

FIG. 3B shows an alternative design of a support mold 2'. The support mold 2' has a pot-like body 2a', in which the escape route marking with its supporting element 4, the photoluminescent material 8 and the covering 6 is arranged. A T-shaped punch 2c', which is held in the pot-like body 2a', is arranged on the cover. The T-shaped punch 2c' has a punch head 3 and a punch handle 5. The punch head 3 is held in the pot-like body 2a' via two pairs of protruding projections 7. The T-shaped punch 2c' can be used for example in that the pot-like body 2a' is bent up and the punch 2c' is inserted. Alternatively, it is also possible to push the T-shaped punch 2c' into the pot-like body 2a'. As shown in FIG. 3B, the pot-like body 2a' can be designed with rounded corners E. Rounded corners E prevent a ripping of the support mold 2' during the bending process. A silicone with the greatest possible edge tear strength and tear propagation resistance is preferably used for the support mold 2'.

The prefabricated solidification mold 20 shown in FIG. 4 is designed in a considerably more stable manner compared to the support mold 2 and preferably permits only minimal deformation movements due to its low elasticity. Due to the minimal elasticity, the heated support mold 2 can be more easily inserted into the prefabricated solidification mold 20 so that the support mold 2 can cool while being securely held with constant immobilization and the incorporated escape route marking 4, 6, 8 can solidify. Thus, a thermally deformed escape route marking is formed. After the solidification, the thermally deformed escape route marking 1 and the support mold 2 can be removed from the prefabricated solidification mold 20 and separated from each other. The cooling process can also be actively supported by a cooling, for example with air.

When using a deforming device 22 according to FIG. 5, the heated support mold 2 is inserted into the deforming device 22, wherein the plurality of rods 22 are first positioned appropriately far apart so that the support mold 2 can be comfortably inserted into the deforming device 22. With the inserting of the support mold 2 into the deforming device 22, the rods 24 can be moved into a desired position via the control unit 20 so that the rods 24 define a predefined deformation of the support mold. After the setting of the rods 24, the support mold 2 can cool in the deforming device 22 in its deformation position so that an escape route marking 1 is formed according to the deformation set by the rods 24. After the solidification, the rods 24 can move back from their position forming the deformation so that the support mold 2 can be comfortably removed from the deforming device 22. Since the support mold 2 returns to its initial position, the shaped escape route marking 1 can be comfortably removed from the support mold 2. Alternatively, it is also conceivable that the support mold 2 is already inserted into the deforming device 22 and is first heated there before the rods 24 are moved into the desired deformation position.

Figure 6:
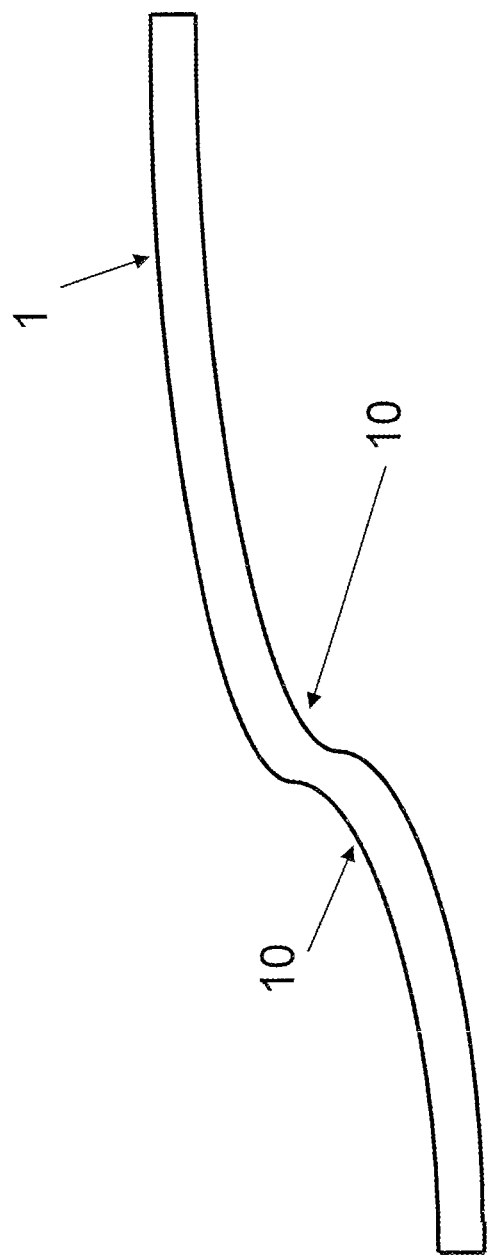
FIG. 6 shows a top view of an escape route marking deformed individually in the plane.

FIG. 6 shows an example of a top view of an escape route marking 1, which was deformed individually in the plane, wherein the support mold 2 was used for the deforming in connection with the solidification mold 20 according to FIG. 4 or the deforming device 22 according to FIG. 5. The escape route marking 1 according to FIG. 6 is formed with a curved contour, wherein curved means that the contour of the escape route marking 1 has an inflection point 10 between two opposite curvatures.

The escape route marking 1 is thus producible with simple means and can also be produced with any shape. Moreover, the method according to the invention for producing the escape route marking 1 can be implemented with simple means. Furthermore, the used means for the method for production can be reused for a plurality of escape route markings.

The invention claimed is:

1. A method for producing an escape route marking, comprising:
    inserting a supporting element into a heatable and malleable support mold;
    arranging a photoluminescent material on the supporting element;
    arranging a transparent covering on the supporting element;
    heating and deforming the escape route marking in the heatable and malleable support mold, the escape route marking including the supporting element, the photoluminescent material and the transparent covering; and
    solidifying the escape route marking in the heatable and malleable support mold in a deformed shape.

2. The method according to claim 1, wherein arranging the photoluminescent material and arranging the transparent covering comprises one of:
    arranging the photoluminescent material and the transparent covering on the supporting element in succession into the heatable and malleable support mold; or
    joining the photoluminescent material and the transparent covering to each other before inserting the joined photoluminescent material and transparent covering into the heatable and malleable support mold.

3. The method according to claim 1, wherein:
    the heatable and malleable support mold is made of silicone; and
    after solidifying in the heatable and malleable support mold, the heatable and malleable support mold returns to its a non-deformed initial shape and the escape route marking remains in the deformed shape.

4. The method according to claim 1, further comprising:
    arranging the support mold in a solidification device before at least one of deforming or solidifying the escape route marking heated in the support mold.

5. The method according to claim 4, wherein the solidification device is a prefabricated solidification mold.

6. The method according to claim 4, wherein the solidification device is a deforming device connected to a control unit.

7. The method according to claim 6, characterized in that wherein the deforming device has a plurality of rods arranged in a parallel manner, each of the plurality of rods shiftable in its longitudinal direction by the control device, in order to bring the escape route marking into the deformed shape.

8. The method according to claim 6, further comprising:
    after arranging the heated mold in the deforming device, bringing rods of the deforming device into respective positions for achieving a desired deformation so that the escape route marking in the heatable and malleable support mold solidifies in the deformed shape.

9. The method according to claim 1, wherein the transparent covering has a thermally malleable polycarbonate.

10. The method according to claim 1, wherein at least one of the supporting element, the photoluminescent material or the transparent covering is thermally malleable alone or together lying on top of each other.

11. An escape route marking produced with the method according to claim 1, wherein the deformed shape has at least one curved section with opposite curvatures.

12. The escape route marking according to claim 11, wherein the deformed shape has at least one non-linear track section with one or more radii.

13. The escape route marking according to claim 11, wherein color pigments are incorporated in the transparent covering.

14. The escape route marking according to claim 11, characterized in that wherein the transparent covering comprises a thermally malleable polycarbonate.

15. The escape route marking according to claim 11, characterized in that wherein the photoluminescent material is in the form of strips with a length and a width corresponding with dimensions of the transparent covering.

16. The escape route marking according to claim 11, wherein the photoluminescent material is in the form of a strip corresponding with dimensions of the supporting element arranged on the supporting element and on it the transparent covering is arranged on the strip.

17. The escape route marking according to claim 11, wherein a base area of the supporting element is a rectangular manner and has side walls with a thickness D extending along each delimitation of the base area at an angle to the base area, whereby a recess is formed in the supporting element.

18. The escape route marking according to claim 11, wherein the transparent covering has a rectangular base area with projections extending at an angle in the form of side walls with a thickness D' at a distance from each delimitation of the rectangular base area, external edges of the projections resting on insides of side walls of the supporting element and a hollow space formed between the transparent covering and the supporting element when the transparent covering is arranged on the supporting element.

19. The escape route marking according to claim 11, wherein the transparent covering and the supporting element comprise a one-piece hollow profile.

* * * * *